United States Patent Office 2,866,715
Patented Dec. 30, 1958

2,866,715

STABILIZED CRYSTALLINE PETROLEUM WAX

Hallard C. Moyer, Homewood, Ill., assignor to Sinclair Refining Company, New York, N. Y., a corporation of Maine No Drawing. Application August 4, 1955
Serial No. 526,547

5 Claims. (Cl. 106—270)

This invention relates to crystalline wax compositions. More particularly, the present invention is concerned with crystalline paraffin wax compositions of improved gloss stability containing a wax-like solid normal olefin.

The major portion of paraffin wax produced today is consumed by the paper industry as a material for coating or impregnating paper or paperboard products. One property of paraffin wax films which is of special importance in many of these applications is the ability to maintain a high gloss, thus enhancing the appearance and sales appeal of the product involved. Coatings having good initial gloss can normally be prepared by applying a film of wax at a temperature well above the melting point and cooling very readily by immersion in cold water; however, waxed paper or paperboard having good initial gloss often loses this gloss after a few days or weeks apparently due to a change in wax crystalline structure. Furthermore, any tendency to lose gloss is usually amplified by increased ambient temperature. A method for readily modifying wax to prevent loss of gloss on aging is therefore of value particularly if the functional properties of the wax are not adversely affected to a material extent.

It has now been found that incorporation of a small amount of a wax-like solid normal olefin results in marked improvement in gloss retention properties of commercially producted crystalline petroleum waxes. Waxes so modified have also shown improved stability in gloss retention under the influence of elevated temperatures. These advantageous results are achieved by my new compositions of crystalline wax containing a small but effective amount of a defined wax-like solid normal olefin to improve gloss stability.

Compositions of the present invention thus comprise crystalline petroleum waxe and the defined olefins. The amount of olefin which can be used to a special advantage is about 0.1 to 5.0 percent based on the weight of the wax; a more preferred amount is about 0.25 to 1.0 percent. The optimum amount of olefin which can be included is determined by considerations of gloss benefits, softening effect and blocking point and tensile strength reduction. Softening effect and blocking point reduction generally are not materially affected or very pronounced at concentrations of olefin up to about 1 percent. While the additive decreases the tensile strength of the wax, tensile strength frequently is a property of little significance where high gloss is desired and this loss of functional property is not, therefore, of pressing importance. Where, however, tensile strength is of extreme importance in conjunction with retained gloss, the olefin can be employed in minor quantities taking into consideration that gloss improvement can only be obtained up to the limit of tensile strength specification.

The normal olefin is incorporated in crystalline wax most easily in practicing the present invention by raising the temperature of the wax and the olefin until melted, for example to about 145 to 175° F. or more, stirring together and then permitting to cool. Generally crystalline waxes are given a final treatment with activated minerals or clays to remove undesirable constituents and impurities to insure requisite color and odor. For purposes of the present invention, the wax and the olefin additive must be blended after this final treatment in the wax refining operations; this is necessary as the usual clay and mineral treatment employed to produce fully refined waxes would remove the additive from the wax.

The olefins which can be used in the production of compositions according to the present invention are those evidencing a normal physical state similar to the wax to which they are to be added. That is, the normal olefin desirably should be of high enough molecular weight that its melting point will not materially affect blends in which it is used and its solid nature will not result in materially increased oil content of the end product. Particularly satisfactory olefins are those containing about 28 to 50 carbon atoms per molecule and especially 30 to 40 carbon atoms per molecule. Examples include 19-nonacosene, 14-triacontene, 17-tritriacontene, 24-octatriacontene, 24-hentetracontene and so on. A highly satisfactory specific olefin is 17-pentatriacontene.

Crystalline waxes which are the major or base constituents of compositions comprising my invention are known articles of commerce sold annually in very large quantities. Crystalline waxes occur in petroleum oils in a wide range of molecular weights, melting points and other physical properties and by choice of various refining procedures wax fractions of many combinations of properties can be obtained. Order has been introduced into this maze of possible wax fractions by the establishment of standard sets of properties for the various fractions by the ASTM; these standard wax fractions are now commonly identified by their melting points, that is 135–37 ° F. M. P., 125–27° F. M. P. and so on. While the present invention is applicable to crystalline wax fractions in general, I prefer to practice the invention while employing the particular fractions identified by ASTM melting points. Usually, crystalline wax fractions having ASTM melting points of about 125 to 145° F. and preferably 130 to 142° F. are used in the present invention; particularly satisfactory results have been achieved with the 135–37° F. melting point wax.

The compositions have been described as containing crystalline wax and defined amounts of wax-like solid normal olefins as an additive. It should be understood that other materials such as antioxidants and the like can be included in the compositions in the usual amounts to impart special characteristics so long as the gloss stability of the compositions of the present invention are not deleteriously affected.

The invention will be described further in conjunction with the following example. The details disclosed are not to be considered as limiting the invention.

EXAMPLE

Slack wax obtained by solvent dewaxing a lubricating oil distillate from a Mid-Continent base crude was reduced by conventional sweating to obtain a wax of reduced oil content. This wax, containing about 1 percent occluded oil, was deoiled by a conventional solvent deoiling process to obtain a substantially oil-free wax. The wax was percolated through activated bauxite to obtain a fully refined crystalline wax. Two such waxes were prepared, one identified below as "A" had a melting point of 137.2° F. and the other, "B," a melting point of 136.1° F. A technical grade of the olefin 17-pentatriacontene (a product of Armour and Co.) having a melting point of about 122° F. was incorporated in samples of the wax by raising the temperature of the wax to about 150° F., adding the olefin, stirring for about 5 minutes and permitting to cool. The samples were then applied to paperboard and paper in accordance with standard procedures and subjected to various tests as indicated below. Significant data obtained are:

Table
PROPERTIES OF BLENDS OF CRYSTALLINE WAX AND 17-PENTATRIACONTENE

| | Coated Paperboard Gloss [1] | | Coated Paper Gloss [1] | | Melting Point, °F. | Percent Oil | Pentration @ 90°F. mm. × 10 Per 100 g. Per 5 Sec. | Saybolt Color | Odor |
|---|---|---|---|---|---|---|---|---|---|
| | 0 Days | 14 Days | 0 Days | 3 Days | | | | | |
| Test Conditions: | | | | | | | | | |
| ASTM Test No | | | | | D87-42 | D721-53T | D1321-54T | D156-53T | |
| Storage Temperature, °F | 77 | 77 | 77 | 105 | | | | | |
| Wax Composition: | | | | | | | | | |
| Wax "A," 137.2 ASTM, M. P | 91 | 84 | 92 | 57 | 137.2 | 0.17 | 15 | +30 | Nil. |
| Wax "A," +0.25% Additive | 93 | 93 | 92 | 80 | 137.2 | | 16 | +30 | Nil. |
| Wax "A," +0.50% Additive | 93 | 94 | 92 | 88 | 137.2 | | 17 | +30 | Nil. |
| Wax "A," +1.0% Additive | 93 | 91 | 94 | 96 | 137.2 | | 17 | +30 | Nil. |
| Wax "A," +2.5% Additive | 94 | 91 | 94 | 86 | 136.9 | | 20 | +30 | Nil. |
| Wax "A," +5.0% Additive | 96 | 91 | 93 | 65 | 136.4 | 0.31 | 23 | +30 | Nil. |
| Wax "B," 136.1 ASTM, M. P | 94 | 80 | 92 | 87 | 136.1 | 0.12 | 16 | +30 | Nil. |
| Wax "B," +0.25% Additive | 94 | 90 | 92 | 93 | 136.0 | | 16 | +30 | Nil. |
| Wax "B," +0.50% Additive | 94 | 95 | 92 | 95 | 136.0 | | 17 | +30 | Nil. |
| Wax "B," +1.0% Additive | 95 | 92 | 93 | 94 | 136.0 | | 18 | +30 | Nil. |
| Wax "B," +2.5% Additive | 96 | 92 | 95 | 70 | 135.7 | | 21 | +30 | Nil. |
| Wax "B," +5.0% Additive | 96 | 92 | 94 | 58 | 135.3 | 0.17 | 24 | +30 | Nil. |

[1] Gardner 75° Glossmeter readings.

These data show that with the higher melting point wax "A" the incorporation of the olefin effected a retention of gloss stability at constant temperature throughout a 14-day test period and that at the more severe elevated temperature test substantial percentages of gloss were retained in all instances with the exception of compositions containing 1 percent and 5 percent of the olefin. At 1 percent concentration, gloss was actually improved under the severe conditions of elevated temperature whereas at 5 percent, gloss tended to decrease materially. With wax "B" gloss retention throughout the 14-day test period was substantially 100% whereas the same wax under the elevated temperature test showed improvement in gloss retention through additive concentrations of up to about 1 percent, and a lessening of effect at greater concentrations. The other physical properties recorded show that the present invention does not deleteriously affect melting point, oil content or hardnes to an extent that specifications would be difficult to meet.

I claim:
1. A composition consisting essentially of a crystalline petroleum wax and a small but effective amount of a wax-like solid normal olefin to improve the gloss stability of the crystalline wax said olefin containing about 28 to 50 carbon atoms.

2. The composition of claim 1 wherein said olefin is 17-pentatriacontene.

3. A composition according to claim 1 wherein said crystalline wax has an ASTM melting point of about 130 to 142° F.

4. A composition according to claim 3 wherein said olefin is 17-pentatriacontene and is present in an amount of about 0.25 to 1.0 weight percent, based on the wax.

5. A composition in accordance with claim 1 wherein said olefin is present in an amount of about 0.1 to 5.0 weight percent based on the wax.

References Cited in the file of this patent
UNITED STATES PATENTS 2,599,130    Rumberger et al. _____ June 31, 1952

FOREIGN PATENTS 893,464    France _____ July 28, 1944
921,044    France _____ Apr. 24, 1947
957,626    France _____ Feb. 22, 1950
957,627    France _____ Feb. 22, ,1950

OTHER REFERENCES

Godo: 43, C. A., 5153f (1949).
Asselineau: "Bull. Soc. Chem. de France," 19 (1952), 557 and 562.
Kariyone et al.: 46, C. A., 5869b (1952).
Chibnall et al.: "Biochem. J." 58, 506–512 (1954).